US012315396B1

(12) United States Patent
Randolph et al.

(10) Patent No.: US 12,315,396 B1
(45) Date of Patent: May 27, 2025

(54) SIGNAL DEVICE AND SIGNALING METHOD

(71) Applicants: Kristal L. Randolph, Hartsel, CO (US); Eugene L. Randolph, Hartsel, CO (US)

(72) Inventors: Kristal L. Randolph, Hartsel, CO (US); Eugene L. Randolph, Hartsel, CO (US)

( * ) Notice: Subject to any disclaimer, the term of this patent is extended or adjusted under 35 U.S.C. 154(b) by 0 days.

(21) Appl. No.: 19/058,259

(22) Filed: Feb. 20, 2025

(51) Int. Cl.
*G09F 7/18* (2006.01)
*G09F 15/00* (2006.01)

(52) U.S. Cl.
CPC .............. *G09F 15/005* (2013.01); *G09F 7/18* (2013.01); *G09F 15/0037* (2013.01); *G09F 15/0087* (2013.01); *G09F 2007/1878* (2013.01)

(58) Field of Classification Search
CPC ...... G09F 15/005; G09F 7/18; G09F 15/0037; G09F 15/0087; G09F 2007/1878; F16L 3/1218; F04D 25/086; E01F 9/65
USPC ..... 248/218.4, 219.2, 219.4, 229.14, 229.24, 248/230.5, 231.61, 251, 309.2, 316.6, 248/125.7, 539, 521; 416/70 R, 70 A, 71, 416/76; 16/63 R, 63 P, 284, 303
See application file for complete search history.

(56) References Cited

U.S. PATENT DOCUMENTS

| | | | |
|---|---|---|---|
| 1,574,162 | A | 2/1926 | Merrick |
| 2,409,076 | A | 10/1946 | Steinberger et al. |
| 5,959,554 | A | 9/1999 | Armstrong et al. |
| 6,216,371 | B1 | 4/2001 | Kim |
| 6,571,885 | B2 | 6/2003 | Lee, Jr. et al. |
| 7,681,348 | B1 | 3/2010 | Saylor |
| 8,109,020 | B2 | 2/2012 | Boyles et al. |
| 9,601,012 | B2 | 3/2017 | Williams |
| 11,043,149 | B1 | 6/2021 | Archuletta |
| 2008/0229637 | A1 | 9/2008 | Joukov |
| 2017/0061791 | A1 | 3/2017 | Cherewka |
| 2022/0020301 | A1 | 1/2022 | Evans |

FOREIGN PATENT DOCUMENTS

| | | | |
|---|---|---|---|
| AU | 2022204550 | A1 | 7/2022 |
| EP | 2390860 | A1 | 11/2011 |
| KR | 200419435 | Y1 | 6/2006 |

*Primary Examiner* — Cassandra Davis
(74) *Attorney, Agent, or Firm* — Stephen B. Katsaros; Patent Engineering, LLC

(57) ABSTRACT

A signal device is disclosed. The signal device may include a signal shaft and a support shaft. The signal shaft and the support shaft may be adjoined using a coupler. The signal shaft may be coupled to a signal paddle and a handle and rotatably disposed within the coupler. The signal paddle may be rotated by rotating the signal shaft to display a sign, and the signal shaft may be rotated by rotating the handle.

20 Claims, 8 Drawing Sheets

SIGNAL DEVICE AND SIGNALING METHOD

TECHNICAL FIELD

This disclosure pertains to traffic control devices, and more particularly to signal devices and methods to be used by flaggers for controlling vehicle and pedestrian traffic in controlled areas.

BACKGROUND

Flaggers control traffic in designated areas, but their proximity to moving vehicles presents safety risks. Moreover, while directing traffic, using traditional signal devices such as flags or paddles, while maintaining visibility and attention to approaching traffic, may be challenging.

SUMMARY

A signal device is disclosed. The signal device may include a signal shaft and a support shaft. The signal shaft and the support shaft may be adjoined using a coupler. The signal shaft may be coupled to a signal paddle and a handle and rotatably disposed within the coupler. Further, the support shaft may be adjoined to the coupler and may be perpendicular to the signal shaft. A flagger may position the support shaft in a position distant from the pedestrian footpath and a road and easily maneuver the signal paddle by rotating the handle. The handle, when rotated, may be configured to rotate the signal shaft to switch to a desired sign on the signal paddle. The signal device and a signaling method are explained in detail in successive configurations of this disclosure.

In an illustrative configuration, a signal device for controlling vehicle or pedestrian traffic in controlled areas is disclosed. The signal device may include a signal shaft. The signal shaft may include a paddle end, a handle end oppositely disposed to the paddle end, a midpoint formed between the paddle end and the handle end, a first locator formed at the midpoint, a second locator formed circumferentially opposite to the first locator and a signal shaft axis passing through the paddle end and the handle end. The signal device may further include a signal paddle adjoined to the paddle end. The signal paddle may include a first sign corresponding to the first locator and a second sign corresponding to the second locator. The signal device may include a support shaft coupled to the signal shaft. The support shaft may include a connector end, a ground end oppositely disposed to the connector end, and a support shaft axis passing through the connector end and the ground end. The support shaft axis is perpendicular to the signal shaft axis. Further, the signal device may include a coupler. The coupler may include a signal shaft passage, a support shaft passage perpendicularly disposed to the signal shaft passage, and a signal shaft lock disposed in the signal shaft passage to engage either the first locator or the second locator. The signal shaft may further include an assembly condition. In the assembly condition, the signal shaft is rotatably accommodated within the signal shaft passage, the connector end is adjoined to the support shaft passage, and the signal shaft lock is disengaged from the first locator and the second locator. The signal device may include a signal condition. In the signal condition, the signal shaft is rotated within the signal shaft passage until a desired sign from the first sign of the second sign is displayed by the signal paddle. When the desired sign is displayed, the signal shaft lock engages either the first locator or the second locator corresponding to the desired sign.

In an illustrative configuration, a signaling method for controlling vehicle or pedestrian traffic in controlled areas is disclosed, the signaling method may include a first step of providing a signal shaft, the signal shaft may include a paddle end, a handle end oppositely disposed to the paddle end, a midpoint formed between the paddle end and the handle end, a first locator formed at the midpoint, a second locator formed circumferentially opposite to the first locator, and a signal shaft axis passing through the paddle end and the handle end. In the next step, the method may include providing a signal paddle adjoined to the paddle end. The signal paddle may include a first sign corresponding to the first locator and a second sign corresponding to the second locator. In the next step, the method may include providing a support shaft. The support shaft is coupled to the signal shaft. Further, the support shaft may include a connector end, a ground end oppositely disposed to the connector end, and a support shaft axis passing through the connector end and the ground end. The support shaft axis is perpendicular to the signal shaft axis. In the next step, the method may include providing a coupler. The coupler may include a signal shaft passage, a support shaft passage perpendicularly disposed to the signal shaft passage, and a signal shaft lock disposed in the signal shaft passage to engage either the first locator or the second locator. Further, the method may include transitioning the signal shaft and the support shaft between an assembly condition and the signal condition. In the assembly condition, the signal shaft is rotatably accommodated within the signal shaft passage, the connector end is adjoined to the support shaft passage, and the signal shaft lock is disengaged from the first locator and the second locator. In the signal condition, the signal shaft is rotated within the signal shaft passage until a desired sign from the first sign of the second sign is displayed by the signal paddle, and when the desired sign is displayed, the signal shaft lock engages either the first locator or the second locator corresponding to the desired sign.

Further areas of applicability of the present disclosure will become apparent from the detailed description provided hereinafter. It should be understood that the detailed description and specific examples, while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than necessary for a fundamental understanding of the system and the various ways it is practiced. The following figures of the drawing include.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label, irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Flaggers are typically positioned near moving traffic in designated areas, such as school zones, construction, maintenance, etc. Notwithstanding the presence of traffic control devices, including cones or barriers, flaggers remain susceptible to being struck by vehicles if drivers fail to comply with traffic signals, misinterpret or disregard the flagger's instructions, or lose control of their vehicles. Furthermore, within controlled areas, particularly in work zones, the ability of flaggers to maintain sustained focus may be compromised by various factors, including instances where vehicles do not stop as required or approach dangerously fast.

To ensure the safety of the flaggers, a signal device is disclosed. The signal device may include a signal shaft and a support shaft. The signal shaft and the support shaft may be adjoined using a coupler. The signal shaft may be coupled to a signal paddle and a handle. Further, the signal shaft may be rotatably accommodated within and extend from the coupler by a predefined distance to ensure the signal paddle is in a visible range approaching vehicles and pedestrians. Further, the support shaft may be adjoined to the coupler and may be perpendicular to the signal shaft. The flagger may position the support shaft at a position from the ground on a position distant from the pedestrian footpath and a road and easily maneuver the signal paddle by rotating the handle. When rotated, the handle may be configured to rotate the signal shaft to switch to a desired sign on the signal paddle. The signal device, along with various configurations, are explained in detail in conjunction with FIGS. 1-11.

Figure 1:
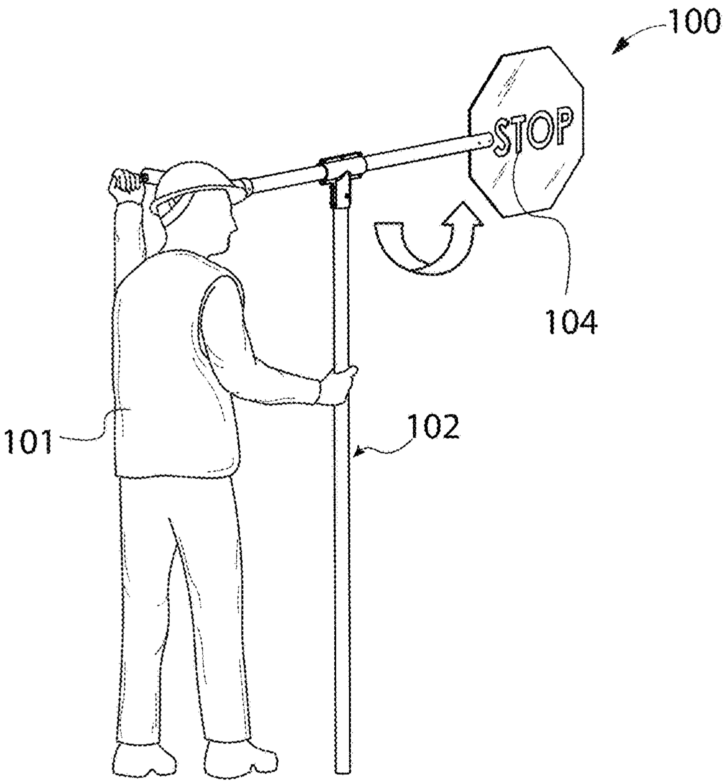
FIG. 1 illustrates a schematic of a flagger utilizing a signal device to display a signal.

FIG. 1 illustrates a schematic 100 of a flagger 101 utilizing a signal device 102 to display a signal. The flagger 101 may operate the assembly condition and a signal condition. In the assembly condition, the flagger 101 may assemble the signal device 102, and in the signal condition, the flagger 101 may place the signal device 102 on the ground while facing the approaching traffic and/or pedestrians (not illustrated). Additionally, the flagger 101 may hold the signal device 102 with one hand and use the other hand to display a first sign 104. When assembled, the signal device 102 may be formed of a height from about five (5) feet to about seven (7) feet, or a height exceeding the height of the flagger 101.

Figure 2:
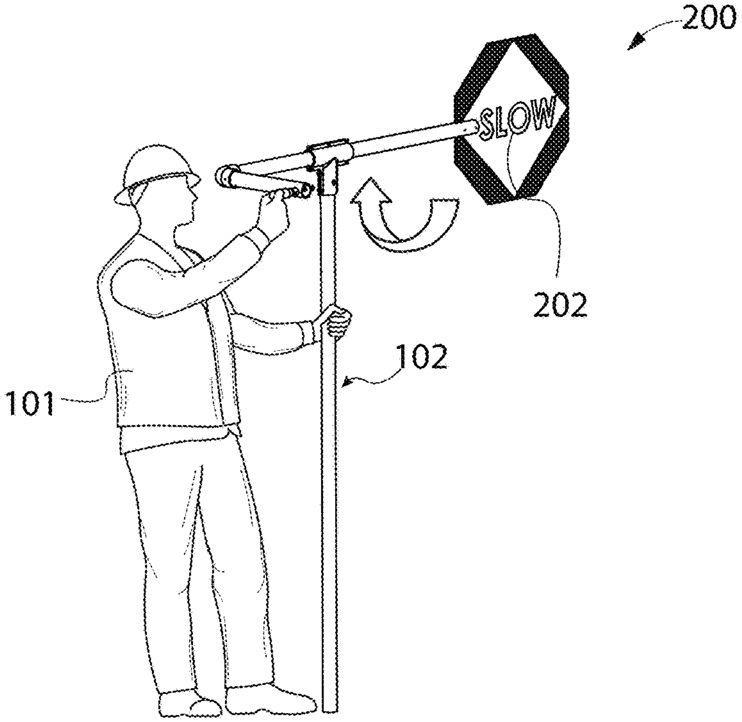
FIG. 2 illustrates a schematic of the flagger utilizing the signal device in the signal condition.

FIG. 2 illustrates a schematic 200 of the flagger 101 utilizing the signal device 102 in the signal condition. As such, in the signal condition, the flagger 101 may operate the signal device 102 to switch to a second sign 202 from the first sign 104. To operate the signal device 102, the flagger 101 may rotate or swivel the signal paddle (illustrated as signal paddle 308 in FIG. 3) horizontally, or about a horizontal axis parallel to the ground to control the approaching traffic and/or pedestrians. As such, in some configurations, the length of the signal paddle from the flagger 101 may be from about three (3) feet to about five (5) feet. Advantageously, the flagger 101 may stand a distance from the road while operating the signal device 102. The signal device 102 is explained in detail in conjunction with FIG. 3.

Figure 3:
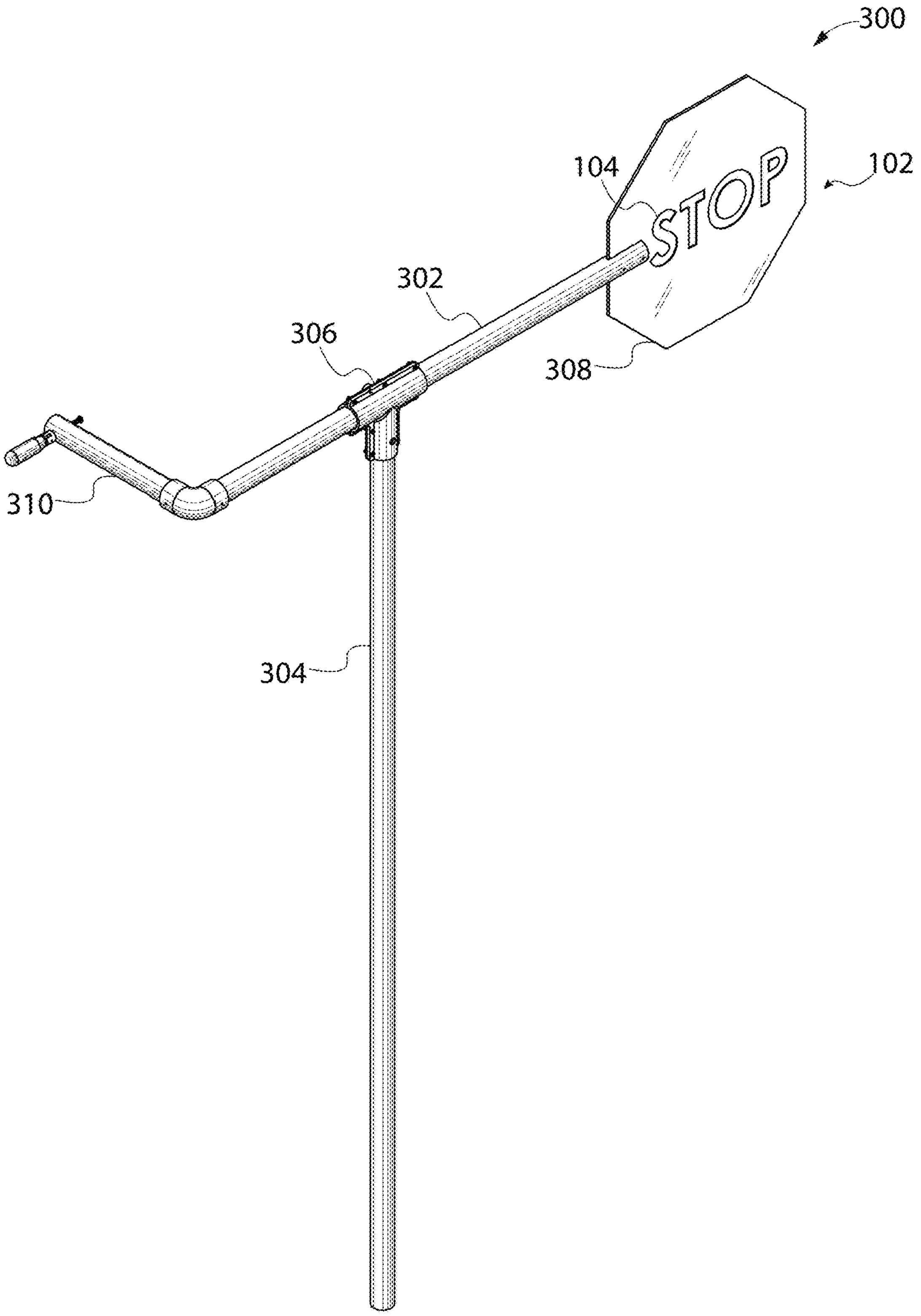
FIG. 3 illustrates a perspective view of the signal device.

FIG. 3 illustrates a perspective view 300 of the signal device 102. The signal device 102 may include a signal shaft 302, a support shaft 304, a coupler 306, a signal paddle 308, and a handle 310. The signal shaft 302 and the support shaft 304 may be coupled to the coupler 306. To elaborate, the signal shaft 302 may be rotatably accommodated within the coupler 306, and the support shaft 304 may be fixedly coupled to the coupler 306. Further, the signal paddle 308 may be coupled to an end of the signal shaft 302. Similarly, the handle 310 may be coupled to either end of the signal shaft 302.

The signal paddle 308 may include a first sign 104 (refer to FIG. 1) and a second sign 202 (refer to FIG. 2). The first sign 104 and the second sign 202 may be arranged in an inverse configuration. For instance, the signal paddle 308 may include a first face on which the first sign 104 is displayed and a second face on which the second sign 202 is displayed. The first sign 104 on the first face may be designed in an orientation inverse to that of the second sign 202 on the second face, ensuring that each signal, when displayed, is clearly visible and comprehensible to approaching traffic or pedestrians. The first sign 104 and the second sign 202 may include but not limited to, a stop signal, a slow signal, a go signal, or similar signals.

While operating the signal device 102, the flagger 101 may rotate the handle 310 to rotate the signal shaft 302. Accordingly, the signal paddle 308 may rotate in unison with the signal shaft 302. Moreover, in the signal condition, the flagger 101 may rotate the handle 310 until a desired signal from the first sign 104 and the second sign 202 may be displayed by the signal paddle 308. When the desired signal may be displayed, the signal shaft 302 may be locked within the coupler 306 until the handle 310 may be rotated again by the flagger 101. The assembly and various configurations of the signal shaft 302, the support shaft 304, and the coupler 306 are explained in detail hereinafter.

Figure 4:
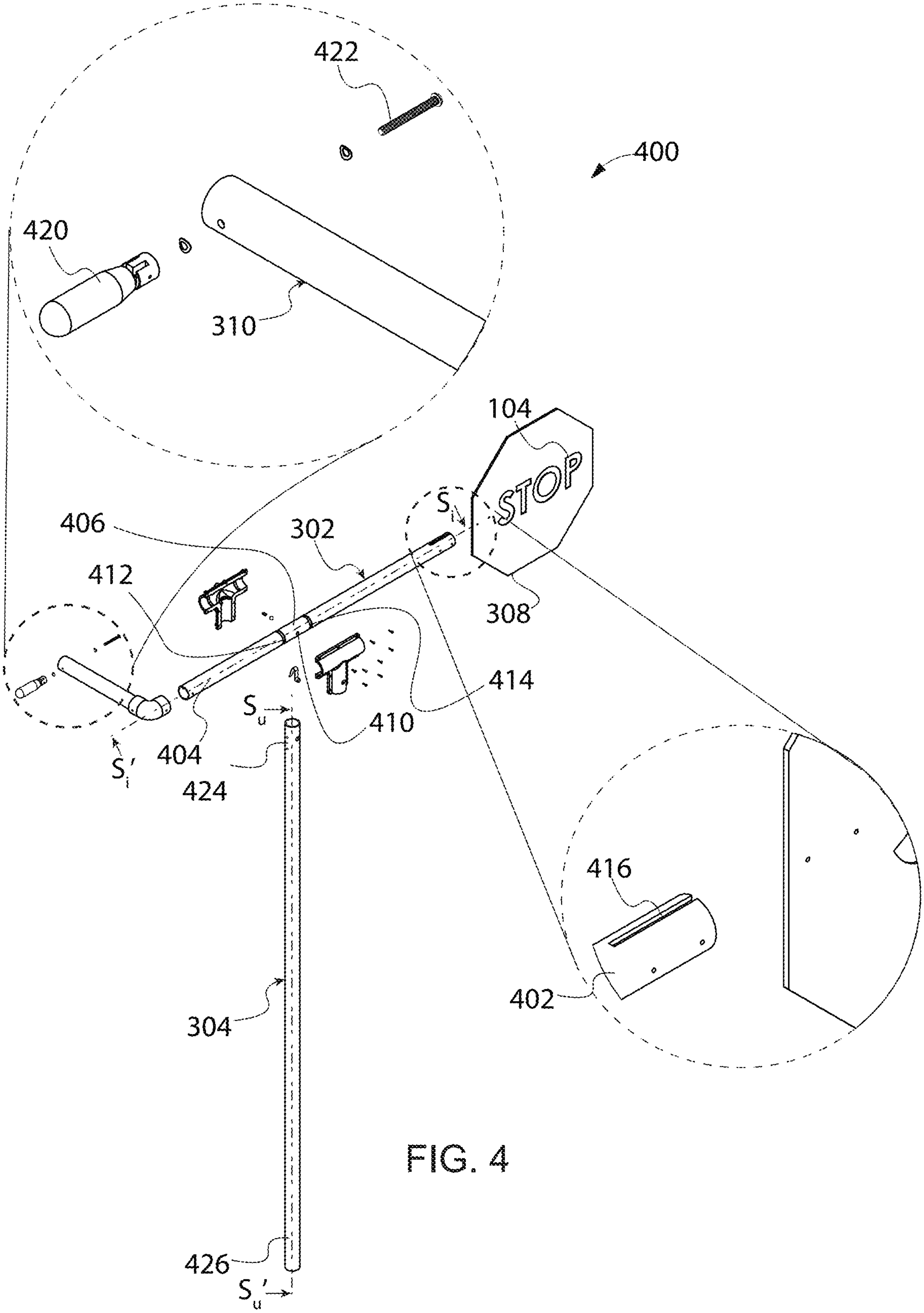
FIG. 4 illustrates an exploded view of the signal device.

FIG. 4 illustrates an exploded view 400 of the signal device 102. As explained earlier, the signal device 102 may include the signal shaft 302, the support shaft 304, and the coupler 306 configured to couple the signal shaft 302 and the support shaft 304. The signal shaft 302 may include a paddle end 402, a handle end 404 oppositely disposed to the paddle end 402, and a midpoint 406 formed between the paddle end 402 and the handle end 404. Further, the signal shaft 302 may include a first locator 408 formed at the midpoint 406, and a second locator 410 formed circumferentially opposite to the first locator 408. Further, the signal shaft 302 defines a signal shaft axis ($S_i$-$S_i$') passing through the paddle end 402 and the handle end 404.

The signal shaft 302 may further include a first guideway 412 and a second guideway 414. The first guideway 412 may be formed between the midpoint 406 and the paddle end 402, and the second guideway 414 may be formed between the midpoint 406 and the handle end 404. In other words, the first guideway 412 and a second guideway 414 may be configured to accommodate the midpoint 406 therebetween. The first guideway 412 and the second guideway 414 may be configured to engage with one or more protrusions (explained later) of the coupler 306 to prevent a linear sliding motion of the signal shaft 302 relative to the coupler 306.

In an illustrative configuration, the first locator 408 and the second locator 410 may include circumferential interlocks. For example, the first locator 408 and the second locator 410 may include detents, or notches configured to couple to a locking mechanism (illustrated later). Alternatively, the first locator 408 and the second locator 410 may also include, but not limited to ratchets, enclosure for bayonet fittings, and the like.

In an illustrative configuration, the paddle end 402 may include a slit 416. The slit 416 may be engaged to the signal paddle 308. Further, after engaging, the signal paddle 308 may be fastened to the paddle end 402 using any fastening methods known in the art. As such, the signal paddle 308 may be engaged to the slit 416 such that each sign may be in line with each locator on the signal shaft 302. For example, when the signal paddle 308 may be adjoined to the slit 416 at the paddle end 402, the first sign 104 may be in line to the first locator 408, and the second sign 202 may be in line to the second locator 410.

Further, the handle end 404 may be coupled to a handle 310. The handle 310 may be perpendicularly coupled to the handle end 404. Put differently, the handle 310 may be perpendicular to the signal shaft axis ($S_i$-$S_i$'). Moreover, the handle 310 may be coupled to a handle grip 420 using a fastener 422. Further, the handle 310 may be configured to act as a counterweight to the signal paddle 308. In the signal condition, the flagger 101 may hold the handle grip 420 and rotate the handle 310 to rotate the signal shaft 302. With the rotation of the signal shaft 302, the signal paddle 308 may be rotated about the signal shaft axis ($S_i$-$S_i$') to display either the first sign 104 or the second sign 202.

With continued reference to FIG. 4, the support shaft 304 may include a connector end 424, a ground end 426 oppositely disposed to the connector end 424, and a support shaft axis ($S_u$-$S_u$') passing through the connector end 424 and the ground end 426. In the assembly condition, the support shaft 304 may be inserted and locked within the coupler 306. Particularly, the connector end 424 of the support shaft 304 may be accommodated and locked within the coupler 306, and the ground end 426 may be positioned on the ground.

The signal shaft 302 may be rotatably locked within the coupler 306 when the desired signal is displayed by the signal paddle 308. To further elaborate, the signal shaft 302 may be rotatably locked within the coupler 306 using a signal shaft lock. Further, the support shaft 304 may be locked with the coupler 306 using a support shaft lock. The coupler 306, the signal shaft lock, and the support shaft lock are explained in detail hereinafter.

Figure 5:
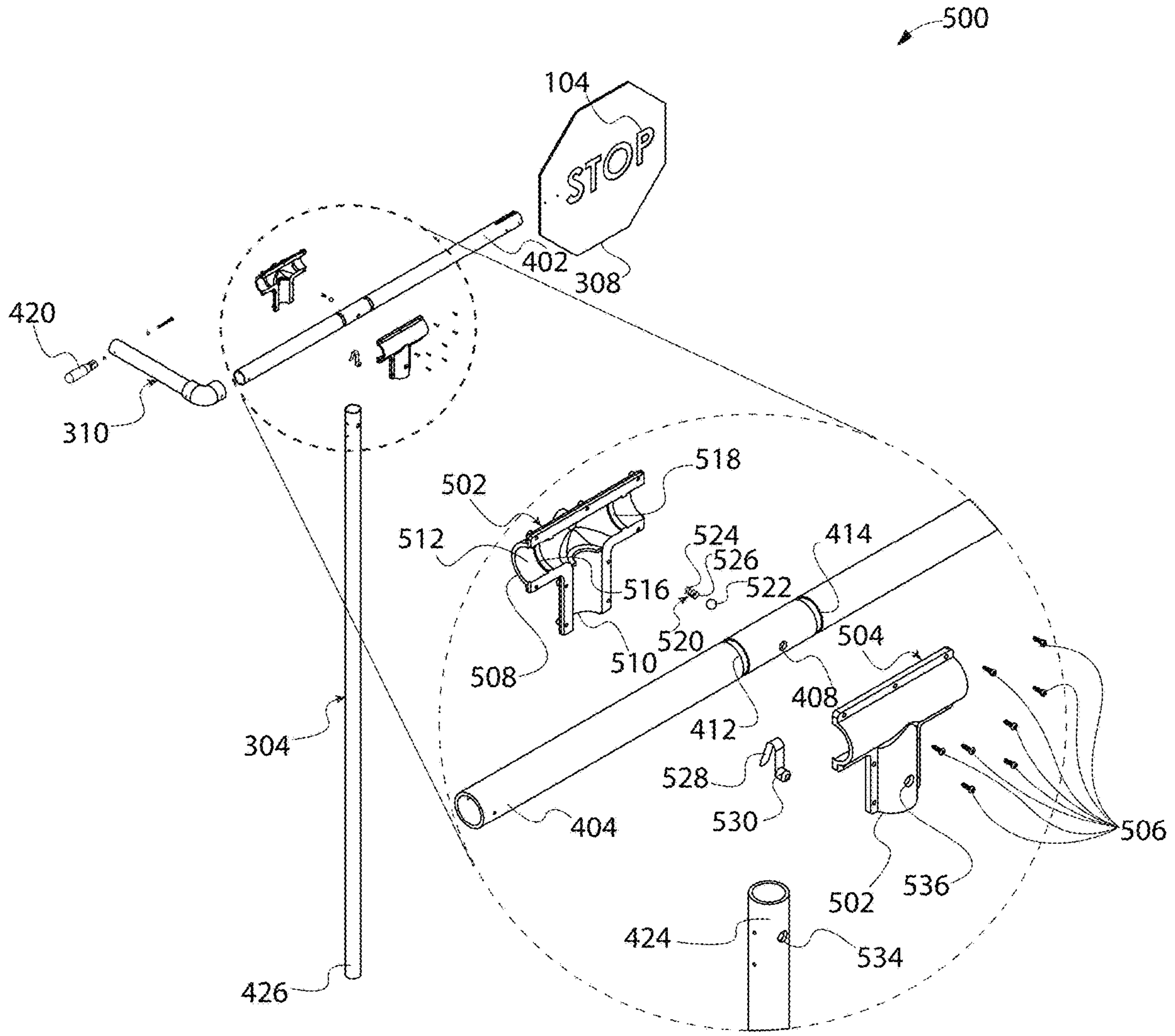
FIG. 5 illustrates another exploded view of the signal device.

FIG. 5 illustrates another exploded view 500 of the signal device 102. The coupler 306 may include a first T-housing 502 and a second T-housing 504. The first T-housing 502 and the second T-housing 504 may be adjoined together using fasteners 506. Further, after being adjoined, the first T-housing 502 and the second T-housing 504 may form a signal shaft passage 508 and a support shaft passage 510. The signal shaft passage 508 may be perpendicularly disposed to the support shaft passage 510. The signal shaft passage 508 may be configured to accommodate the signal shaft 302, and the support shaft passage 510 may be configured to accommodate the support shaft 304. As such, due to the support shaft passage 510 being perpendicular to the signal shaft passage 508, the support shaft 304 when accommodated within the support shaft passage 510 may be perpendicular to the signal shaft 302 accommodated within the signal shaft passage 508. Put differently, the signal shaft axis ($S_i$-$S_i$') may be perpendicular to the support shaft axis ($S_u$-$S_u$').

The signal shaft passage 508 may include an inner surface area 512. The inner surface area 512 may be in surface contact with the signal shaft 302. As explained earlier, the signal shaft 302 may include the first guideway 412 and the second guideway 414 engaged with one or more protrusions in the coupler 306. Particularly, the one or more protrusions may include a first protrusion 516 and a second protrusion 518. The first protrusion 516 may engage with the first guideway 412, and the second protrusion 518 may engage with the second guideway 414. Hence, the first guideway 412 and the second guideway 414 may be enclosed by the signal shaft passage 508, and the engagement of the first guideway 412 and the second guideway 414 with the first protrusion 516 and the second protrusion 518 respectively, may interlock the signal shaft 302 with the coupler 306.

In an illustrative configuration, the signal shaft lock may be coupled to the inner surface area 512. To further elaborate, the signal shaft lock may include a biasing member 520 and a ball 522. The ball 522 may be coupled to the biasing member 520. As such, in some configurations, the biasing member 520 may include a first biasing end 524 and a second biasing end 526. The first biasing end 524 may be adjoined to a portion of the inner surface area 512 between the first protrusion 516 and the second protrusion 518. Further, the second biasing end 526 may be coupled to the ball 522. The biasing member 520 herein may include a coil spring. Alternatively, the signal shaft lock may include a motor-actuated pin lock, magnetic brake, bolt-and-nut, spring loaded bearing, and the like.

The signal shaft lock may be configured to engage either the first locator 408 or the second locator 410 to lock the signal shaft 302 within the coupler 306 when a desired signal on the signal paddle 308 may be displayed. In particular, the ball 522 may be biased, via a biasing force from the biasing member 520 to engage either the first locator 408 or the second locator 410 to lock the signal shaft 302 within the coupler 306, or the signal shaft passage 508. For example, if the desired signal may be the first sign 104, the ball 522 may be biased to engage the first locator 408. In another example, the desired signal may be the second sign 202, the ball 522 may be biased to engage the second locator 410. Hence, the signal shaft 302 may be prevented from inadvertent rotation, thereby avoiding accidental switching of the signal paddle 308 between the first sign 104 or the second sign 202.

The user may apply a torque on the signal shaft 302 by rotating the handle 310 to switch to another signal. Consequently, the moment of the torque may exceed the moment of the biasing force, and the ball 522 may be disengaged from either the first locator 408 or the second locator 410 to unlock the signal shaft 302 within the signal shaft passage 508. The signal shaft 302 may be rotated until a desired signal from the first sign 104 or the second sign 202 may be attained and displayed by the signal paddle 308.

In an illustrative configuration, the support shaft lock may include a biasing strip 528 and a pin 530 coupled to the biasing strip 528. The biasing strip 528 may be disposed within the connector end 424. Further, the pin 530 may be configured to adjoin a first lock groove 534 formed on the connector end 424. As such, in some configurations, the support shaft passage 510 may include a second lock groove 536 coinciding with the first lock groove 534. Therefore, the pin 530 while adjoined with the first lock groove 534, may also pass through the second lock groove 536 to lock and secure the connector end 424, or the support shaft 304 within the support shaft passage 510. To disengage the support shaft 304 from the support shaft passage 510, the pin 530 may be manually pressed and disengaged from the second lock groove 536. Consequently, the support shaft 304 may be free to move relative to the support shaft passage 510.

Figure 6:
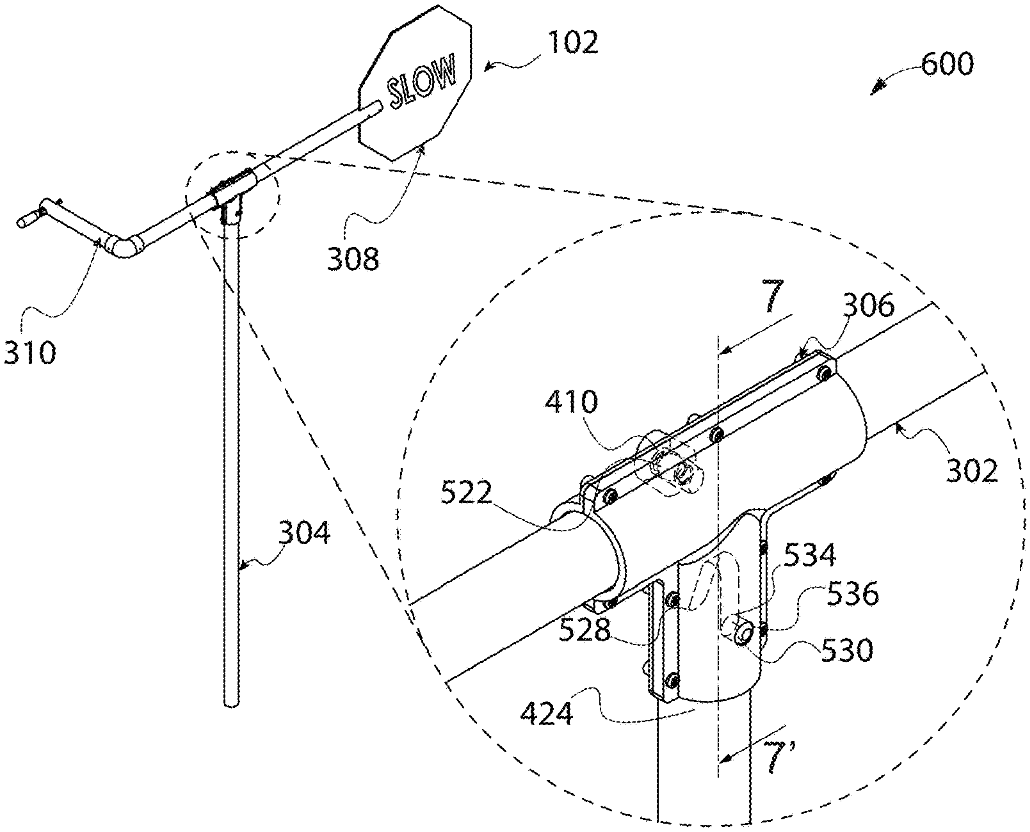
FIG. 6 illustrates an internal view of the signal device in an assembly condition.
Figure 7:
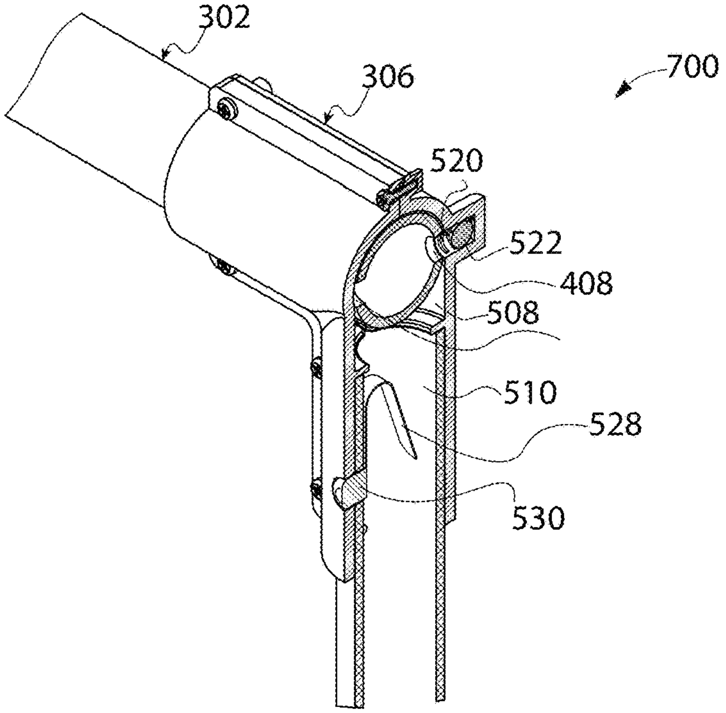
FIG. 7 illustrates a sectional view of the signal device in the assembly condition along a section 7-7' in FIG. 6.

FIG. 6 illustrates an internal view 600 of the signal device 102 in an assembly condition, and FIG. 7 illustrates a sectional 700 view of the signal device 102 in the assembly condition along a section 7-7' in FIG. 6. In the assembly condition, the signal shaft 302 may be rotatably accommodated within the signal shaft passage 508. In particular, the first protrusion 516 and the second protrusion 518 may be slidingly engaged with the first guideway 412 and the second guideway 414 (not shown in figure).

In the assembly condition, the connector end 424 may be adjoined or accommodated within the support shaft passage 510. The support shaft lock may be engaged to lock the connector end 424 with the support shaft passage 510. Particularly, the pin 530 may collectively engage with the first lock groove 534 and the second lock groove 536. Consequently, the rotation of the connector end 424, or the support shaft 304 within the support shaft passage 510, or the rotation of the coupler 306 relative to the support shaft 304 may be prevented as the flagger 101 may rotate the signal shaft 302.

Figure 8:
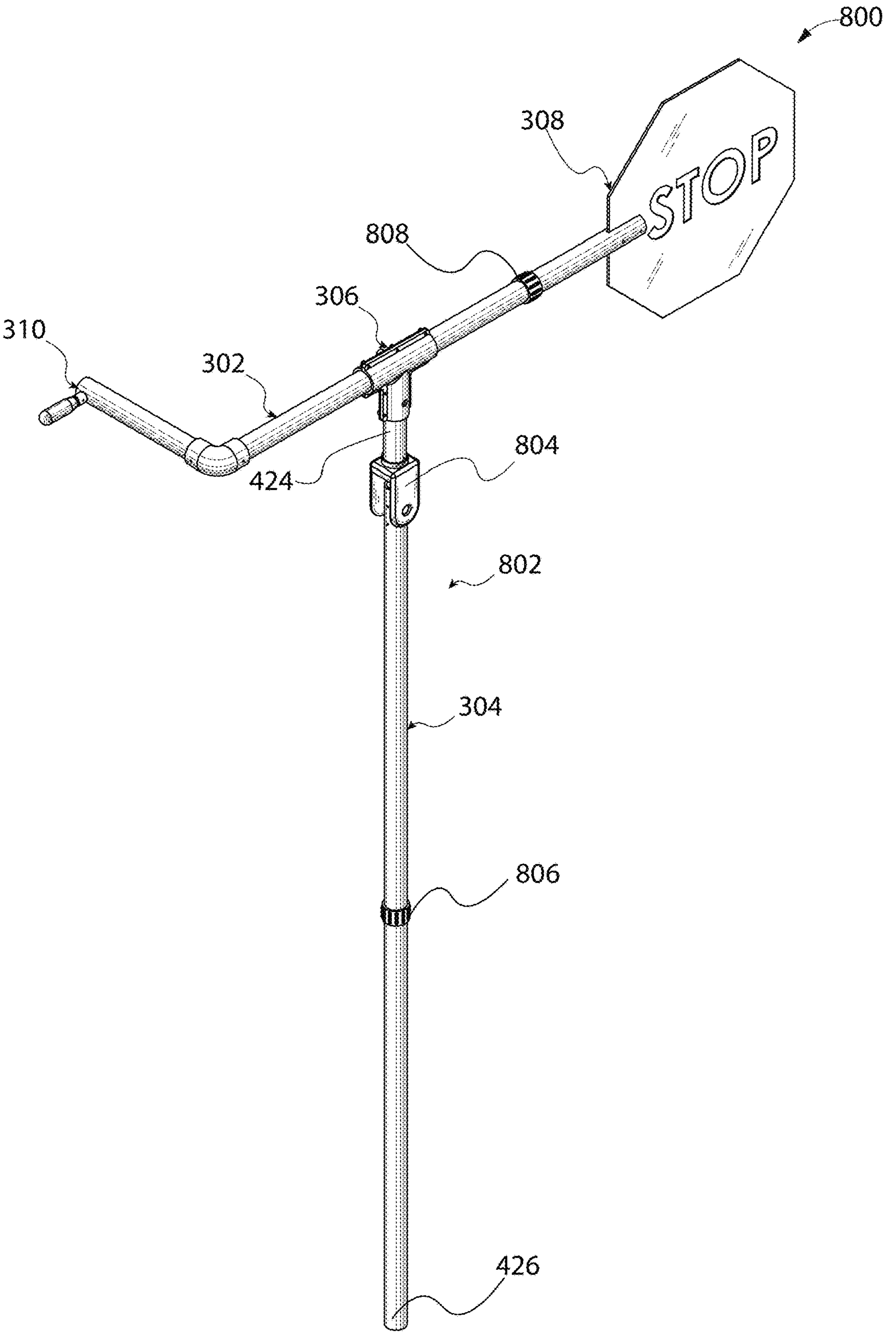
FIG. 8 illustrates a perspective view of an alternate configuration of the signal device.

In an alternative configuration, FIG. 8 illustrates a perspective view 800 of a signal device 802. The signal device may be similar to the signal device 102. The signal device 802 may include a hinge 804, a first adjustor 806, and a second adjustor 808. The hinge 804 may be formed in the support shaft 304. Further, the first adjustor 806 and the second adjustor 808 may be formed on the signal shaft 302 and the support shaft 304, respectively. In particular, the hinge 804 may be formed proximally to the connector end 424, and the first adjustor 806 may be formed between the ground end 426 and the hinge 804. Further, the second adjustor 808 may be formed between the coupler 306 and the signal paddle 308.

With continued reference to FIG. 8, the signal device 802 may be transitioned into a travel condition. In the travel condition, the support shaft 304 may be maneuvered about the hinge 804, the first adjustor 806 and the second adjustor 808 may be adjusted to decrease a length of the signal shaft 302 and the support shaft 304. Consequently, the signal device 802 may be easy to transport. This is explained in detail, hereinafter.

Figure 9:
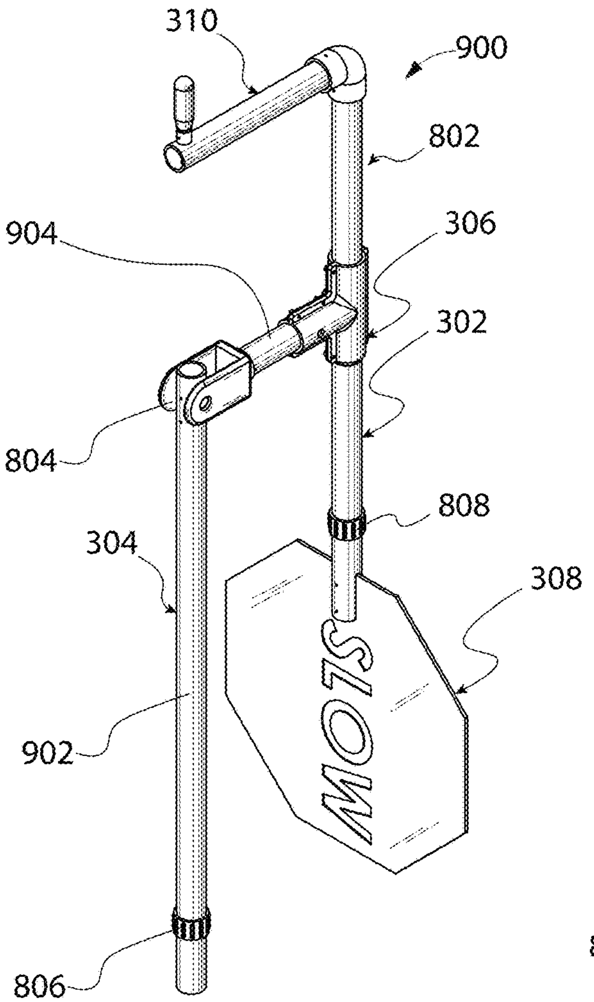
FIG. 9 illustrates a left-perspective view of the alternate configuration of the signal device in a travel condition.
Figure 10:
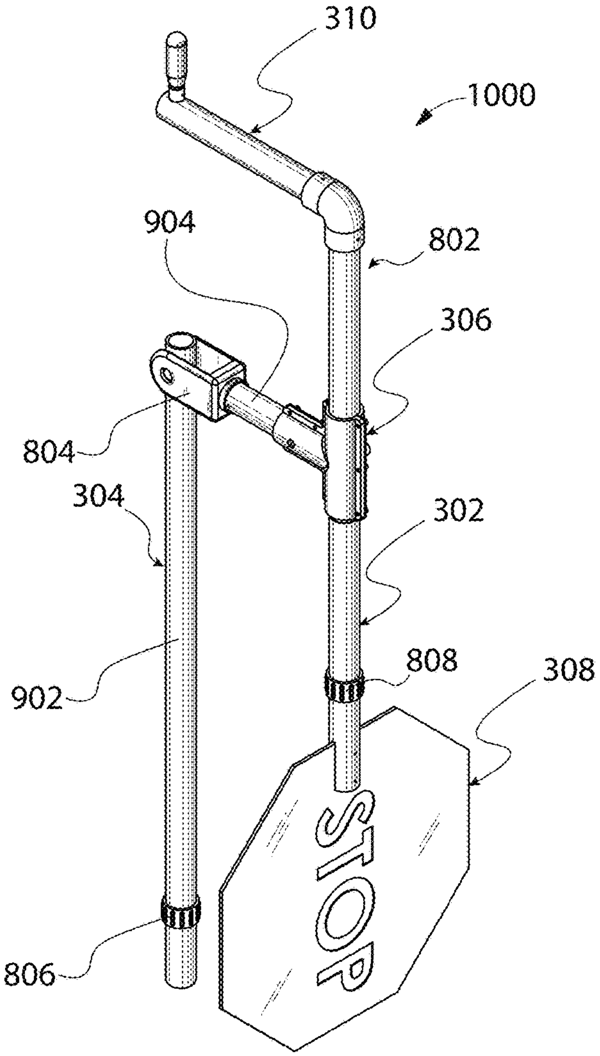
FIG. 10 illustrates a right-perspective view of the alternate configuration of the signal device in a travel condition.

FIG. 9 illustrates a left-perspective view 900 of the alternate configuration of the signal device 802 in the travel condition, and FIG. 10 illustrates a right-perspective view 1000 of the alternate configuration of the signal device 802 in the travel condition. The hinge 804 may be configured to segment the support shaft 304 between a first support shaft segment 902, and a second support shaft segment 904. In the travel condition, the second support shaft segment 904 may be pivoted about the hinge 804 and positioned perpendicular to the first support shaft segment 902. Consequently, the signal shaft 302 may be parallel, or near-parallel to the second support shaft segment 904. Moreover, the first adjustor 806 and the second adjustor 808 may be adjusted to decrease the length of the support shaft 304 and the signal shaft 302 respectively, by a predefined extent. As a result, the signal device 802 may be compact, and easy to handle while traveling.

Figure 11:
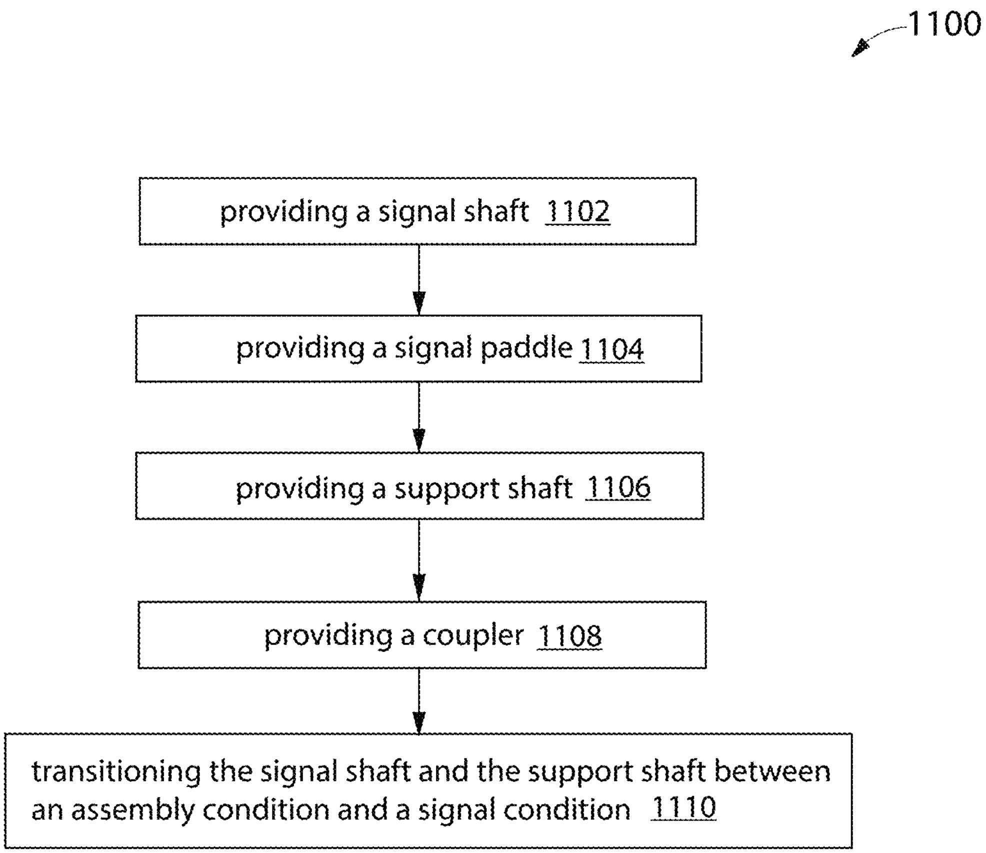
FIG. 11 illustrates a flowchart of a signaling method.

FIG. 11 illustrates a flowchart 1100 of a signaling method. The signaling method may include a first step 1102, in which a signal shaft 302 may be provided. The signal shaft 302 may include a paddle end 402, a handle end 404 oppositely disposed to the paddle end 402, and a midpoint 406 formed between the paddle end 402 and the handle end 404. Further, the signal shaft 302 may include a first locator 408 formed at the midpoint 406, and a second locator 410 formed circumferentially opposite to the first locator 408. Further, the signal shaft 302 defines a signal shaft axis ($S_i$-$S_i'$) passing through the paddle end 402 and the handle end 404.

At step 1104, a signal paddle 308 may be provided. The signal paddle 308 may be adjoined to a slit 416 at the paddle end 402. As such, the signal paddle 308 may be engaged to the slit 416 such that the first sign 104 may be in line with the first locator 408, and the second sign 202 may be in line with the second locator 410.

At step 1106, a support shaft may be provided. The support shaft 304 may include a connector end 424, a ground end 426 oppositely disposed to the connector end 424, and a support shaft axis ($S_u$-$S_u'$) passing through the connector end 424 and the ground end 426. The support shaft axis ($S_u$-$S_u'$) may be perpendicular to the signal shaft axis ($S_i$-$S_i'$).

At step 1108, a coupler may be provided. The coupler 306 may include a first T-housing 502 and a second T-housing 504. The first T-housing 502, and the second T-housing 504 may be adjoined together using fasteners 506, as illustrated. Further, after being adjoined, the first T-housing 502 and the second T-housing 504 may form a signal shaft passage 508 and a support shaft passage 510. The signal shaft passage 508 may be perpendicularly disposed to the support shaft passage 510. The signal shaft passage 508 may be configured to accommodate the signal shaft 302 and the support shaft passage 510 may be configured to accommodate the support shaft 304.

At step 1110, the method may include transitioning the signal shaft and the support shaft between an assembly condition and the signal condition. In the assembly condition, the signal shaft 302 may be rotatably accommodated within the signal shaft passage 508. Further, the connector end may be adjoined to the support shaft passage 510. In the signal condition, the signal shaft 302 may be rotated by rotating a handle 310 within the signal shaft passage 508 until a desired sign from the first sign 104 or the second sign 202 may be displayed by the signal paddle 308. When the desired sign may be displayed, the signal shaft lock engages either the first locator 408 or the second locator 410 corresponding to the desired sign. For example, if the desired signal may be the first sign 104, the signal shaft lock engages the first locator 408. In another example, the desired signal may be the second sign 202, the signal shaft lock may be biased to engage the second locator 410.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or ±0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or ±0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A signal device for controlling vehicle or pedestrian traffic in a designated area, the signal device comprising:
  - a signal shaft comprising:
    - a paddle end;
    - a handle end oppositely disposed to the paddle end;
    - a midpoint formed between the paddle end and the handle end;
    - a first locator formed at the midpoint;
    - a second locator formed circumferentially opposite to the first locator; and
    - a signal shaft axis passing through the paddle end and the handle end;
  - a signal paddle adjoined to the paddle end, the signal paddle comprising:
    - a first sign corresponding to the first locator; and
    - a second sign corresponding to the second locator;
  - a support shaft coupled to the signal shaft, the support shaft comprising:
    - a connector end;
    - a ground end oppositely disposed to the connector end; and
    - a support shaft axis passing through the connector end and the ground end,
  - a coupler, comprising:
    - a signal shaft passage;
    - a support shaft passage perpendicularly disposed to the signal shaft passage; and
    - a signal shaft lock disposed in the signal shaft passage to engage either the first locator or the second locator;
  - an assembly condition, wherein:
    - the signal shaft is rotatably accommodated within the signal shaft passage; and
    - the connector end is adjoined to the support shaft passage,
    - wherein the support shaft axis is perpendicular to the signal shaft axis; and
  - a signal condition, wherein:
    - the signal shaft is rotated within the signal shaft passage until a desired sign from the first sign or the second sign is displayed by the signal paddle; and
    - when the desired sign is displayed,
      - the signal shaft lock engages either the first locator or the second locator corresponding to the desired sign.

2. The signal device of claim 1, wherein the signal shaft further comprises:
  - a first guideway circumferentially formed on the signal shaft; and
  - a second guideway circumferentially formed on the signal shaft,
    - wherein the first guideway and the second guideway are enclosed within the signal shaft passage,
    - wherein the first guideway and the second guideway accommodate the midpoint therebetween.

3. The signal device of claim 2, wherein the signal shaft passage further comprises:
  - an inner surface area, comprising:
    - a first protrusion to engage the first guideway; and
    - a second protrusion to engage the second guideway,
    - wherein the first protrusion and the second protrusion accommodate the signal shaft lock therebetween.

4. The signal device of claim 3, wherein the signal shaft lock comprises:
  - a biasing member comprising:
    - a first biasing end adjoined to a portion of the inner surface area between the first protrusion and the second protrusion; and
    - a second biasing end oppositely disposed to the first biasing end; and
  - a ball coupled to the second biasing end,
  - wherein in the signal condition, the ball is configured to adjoin either the first locator or the second locator.

5. The signal device of claim 1 and further comprising:
  - a handle perpendicularly adjoined to the handle end,
  - wherein the handle is configured to act as a counterweight to the signal paddle, and the handle is rotated to rotate the signal shaft about the signal shaft axis.

6. The signal device of claim 1 and further comprising:
a slit formed at the paddle end to accommodate the signal paddle.

7. The signal device of claim 1 and further comprising:
a first lock groove formed in the connector end; and
a second lock groove formed in the support shaft passage,
wherein the first lock groove coincides with the second lock groove as the connector end engages the support shaft passage.

8. The signal device of claim 7 and further comprising:
a support shaft lock adjoined either to the connector end, or the support shaft passage, the support shaft lock comprising:
a biasing strip; and
a pin coupled to the biasing strip.

9. The signal device of claim 8 and further comprising:
in the assembly condition,
the pin collectively engages the first lock groove and the second lock groove to secure and lock the connector end to the support shaft passage.

10. The signal device of claim 9, wherein the pin is manually pressed and disengaged from the second lock groove, to unlock the support shaft passage from the connector end.

11. A signaling method for controlling vehicle or pedestrian traffic in controlled areas, the signaling method comprising:
providing a signal shaft, the signal shaft comprising:
a paddle end;
a handle end oppositely disposed to the paddle end;
a midpoint formed between the paddle end and the handle end;
a first locator formed at the midpoint;
a second locator formed circumferentially opposite to the first locator; and
a signal shaft axis passing through the paddle end and the handle end;
providing a signal paddle adjoined to the paddle end, the signal paddle comprising:
a first sign corresponding to the first locator; and
a second sign corresponding to the second locator;
providing a support shaft, wherein the support shaft is coupled to the signal shaft, the support shaft comprising:
a connector end;
a ground end oppositely disposed to the connector end; and
a support shaft axis passing through the connector end and the ground end;
providing a coupler, comprising:
a signal shaft passage;
a support shaft passage perpendicularly disposed to the signal shaft passage; and
a signal shaft lock disposed in the signal shaft passage to engage either the first locator or the second locator; and
transitioning the signal shaft and the support shaft between:
an assembly condition, comprising:
rotatably accommodating the signal shaft within the signal shaft passage; and
adjoining the connector end to the support shaft passage,
wherein the support shaft axis is perpendicular to the signal shaft axis; and
a signal condition, comprising:
rotating the signal shaft within the signal shaft passage until a desired sign from the first sign or the second sign is displayed by the signal paddle; and
engaging the signal shaft lock engages either the first locator or the second locator corresponding to the desired sign, when the desired sign is displayed.

12. The signaling method of claim 11, wherein providing the signal shaft further comprises:
providing a first guideway circumferentially formed on the signal shaft; and
providing a second guideway circumferentially formed on the signal shaft,
wherein the first guideway and the second guideway are enclosed within the signal shaft passage,
wherein the first guideway and the second guideway accommodate the midpoint therebetween.

13. The signaling method of claim 12, wherein providing the signal shaft passage further comprises:
the signal shaft passage further comprising:
an inner surface area, comprising:
a first protrusion to engage the first guideway; and
a second protrusion to engage the second guideway,
wherein the first protrusion and the second protrusion accommodate the signal shaft lock therebetween.

14. The signaling method of claim 13, wherein providing the signal shaft passage further comprises:
the signal shaft lock further comprising:
providing a biasing member comprising:
a first biasing end adjoined to a portion of the inner surface area between the first protrusion and the second protrusion; and
a second biasing end oppositely disposed to the first biasing end; and
providing a ball coupled to the second biasing end,
wherein in the signal condition, the ball is configured to adjoin either the first locator or the second locator.

15. The signaling method of claim 11 and further comprising:
providing a handle, wherein the handle is perpendicularly adjoined to the handle end,
wherein the handle is configured to act as a counterweight to the signal paddle, and
the handle is rotated to rotate the signal shaft about the signal shaft axis.

16. The signaling method of claim 11 and further comprising:
providing a slit, wherein the slit is formed at the paddle end to accommodate the signal paddle.

17. The signaling method of claim 11 and further comprising:
providing a first lock groove, wherein the first lock groove is formed in the connector end; and
providing a second lock groove, wherein the second lock groove is formed in the support shaft passage,
wherein the first lock groove coincides with the second lock groove as the connector end engages the support shaft passage.

18. The signaling method of claim 17 and further comprising:
providing a support shaft lock, wherein the support shaft lock is adjoined either to the connector end or the support shaft passage, the support shaft lock comprising:
a biasing strip; and
a pin coupled to the biasing strip.

19. The signaling method of claim 18 and further comprising:

in the assembly condition, the pin collectively engages the first lock groove and the second lock groove to secure and lock the connector end to the support shaft passage.

20. The signaling method of claim 19, wherein the pin is manually pressed and disengaged from the second lock groove, for unlocking the support shaft passage from the connector end.

* * * * *